(12) United States Patent
Shani et al.

(10) Patent No.: US 9,753,750 B2
(45) Date of Patent: Sep. 5, 2017

(54) GLOBAL FEATURE LIBRARY USEABLE WITH CONTINUOUS DELIVERY

(75) Inventors: Inbar Shani, Kibutz Beit Kama (IL); Amichai Nitsan, Rehovot (IL); Lior Manor, Aifei Menashe (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 60 days.

(21) Appl. No.: 14/419,667

(22) PCT Filed: Aug. 30, 2012

(86) PCT No.: PCT/US2012/053212
§ 371 (c)(1),
(2), (4) Date: Feb. 5, 2015

(87) PCT Pub. No.: WO2014/035410
PCT Pub. Date: Mar. 6, 2014

(65) Prior Publication Data
US 2015/0248301 A1  Sep. 3, 2015

(51) Int. Cl.
*G06F 9/44* (2006.01)
*G06F 9/445* (2006.01)
*G06F 17/30* (2006.01)

(52) U.S. Cl.
CPC .......... *G06F 9/44521* (2013.01); *G06F 8/54* (2013.01); *G06F 8/60* (2013.01); *G06F 17/30578* (2013.01)

(58) Field of Classification Search
CPC .................................... G06F 9/44521
USPC ........................................... 717/163
See application file for complete search history.

(56) References Cited

U.S. PATENT DOCUMENTS

| | | |
|---|---|---|
| 2006/0242638 A1 | 10/2006 | Lew et al. |
| 2007/0039054 A1 | 2/2007 | Mulla et al. |
| 2007/0226679 A1 | 9/2007 | Jayamohan et al. |
| 2008/0295045 A1 | 11/2008 | Aktouf |
| 2009/0319472 A1 | 12/2009 | Jain et al. |
| 2012/0182896 A1 | 7/2012 | Jang et al. |
| 2012/0191760 A1 | 7/2012 | Kaufman et al. |

FOREIGN PATENT DOCUMENTS

| | | |
|---|---|---|
| CN | 101122852 | 2/2008 |
| WO | WO-9960487 | 11/1999 |

OTHER PUBLICATIONS

Ross Harmes, "Flipping Out", Dec. 2, 2009, http://code.flickr.net/2009/12/02/flipping-out/.*

(Continued)

*Primary Examiner* — Wei Zhen
*Assistant Examiner* — Lanny Ung
(74) *Attorney, Agent, or Firm* — Mannava & Kang, P.C.

(57) ABSTRACT

A method to manage a global feature library is provided herein. The method provides a global feature library with a plurality of features defined therein. The global feature library includes a feature switch for each of the plurality of features. The feature switch is useable with an application code. The feature switch is linked to an application code. The feature switch includes a feature value that turns a feature associated with the feature switch on and off based on a global value rule. The global rule is transmitted to a client device capable of storing the feature value in-memory.

18 Claims, 5 Drawing Sheets

(56) References Cited

OTHER PUBLICATIONS

Wikipedia, "Feature toggle", Apr. 6, 2012, http://web.archive.org/web/20120406024857/https://en.wikipedia.org/wiki/Feature_toggle.*

Chris Campbell, "Feature flipping", Mar 5, 2012, http://web.archive.org/web/20120305012856/http://99designs.com/tech-blog/blog/2012/03/01/feature-flipping.*

Korean Intellectual Property Office, International Search Report and Written Opinion, Mar. 29, 2013, 9 pages, Daejeon Metropolitan City, Republic of Korea.

Oberoi, N., Getting to Continuous Deployment in Django: Feature Flipping with Gargoyle and Django Waffle, Mar. 7, 2012, http://css.dzone.com/articles/getting-continuous-deployment.

Rathebone, D., Another Look at Continuous Delivery/continuous Deployment, Jun. 3, 2012, http://java.dzone.com/articles/another-look-continuous.

Silveira, G., Thoughtworks Fowler and Humble Talk Continuous Delivery, Feb. 18, 2011, http://www.infoq.com/interviews/jez-humble-martin-fowler-cd.

Supplementary European Search Report, European Patent Application No. 12883663.2, Mar. 17, 2016, 10 pages.

D. Cramer, Product Blog, Partial Deployment with Feature Switches dated on or before May 11, 2012 (6 pages).

Eran Harel, Tech Blog, Feature Flags Made Easy, Jul. 5, 2011 (3 pages).

Chris Campbell, "Feature flipping", 99 designs engineering blog, Mar. 1, 2012, 6 pages.

Ross Harmes, "Flipping Out", code.flickr.com, Dec. 2, 2009, 3 pages.

Wikipedia, "Feature toggle", Apr. 6, 2012, 4 pages. Retrieved from Internet on Jul. 20, 2017. <https://en.wikipedia.org/wiki/Feature_toggle>.

* cited by examiner

500

PROVIDE THE GLOBAL FEATURE LIBRARY WITH A PLURALITY OF FEATURES DEFINED THEREIN, THE GLOBAL FEATURE LIBRARY INCLUDING A FEATURE SWITCH FOR EACH OF THE PLURALITY OF FEATURES
520

↓

LINK THE FEATURE SWITCH TO AN APPLICATION CODE BASE, THE FEATURE SWITCH INCLUDES A FEATURE VALUE ASSOCIATED THEREWITH TO TURN THE FEATURE SWITCH ON AND OFF
540

↓

TRANSMIT THE GLOBAL VALUE RULE TO A CLIENT DEVICE CAPABLE OF STORING THE FEATURE VALUE IN-MEMORY THEREON
560

*Fig. 5*

GLOBAL FEATURE LIBRARY USEABLE WITH CONTINUOUS DELIVERY

CROSS-REFERENCE TO RELATED APPLICATION

This application is a national stage application under 35 U.S.C. §371 of PCT/US2012/053212, filed Aug. 30, 2012.

BACKGROUND

Software development life cycles use continuous delivery to reduce the time code changes spend in a production line. Continuous delivery includes continuous integration (Ci) and continuous, deployment (CD) Continuous integration automates the process of receiving code changes from a specific source configuration management (SCM) tool, constructing deliverable assemblies with the code changes, and testing the assemblies.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

FIG. 5 illustrates a flow chart of a method to manage the global feature library according to an example.

DETAILED DESCRIPTION

Figure 1:
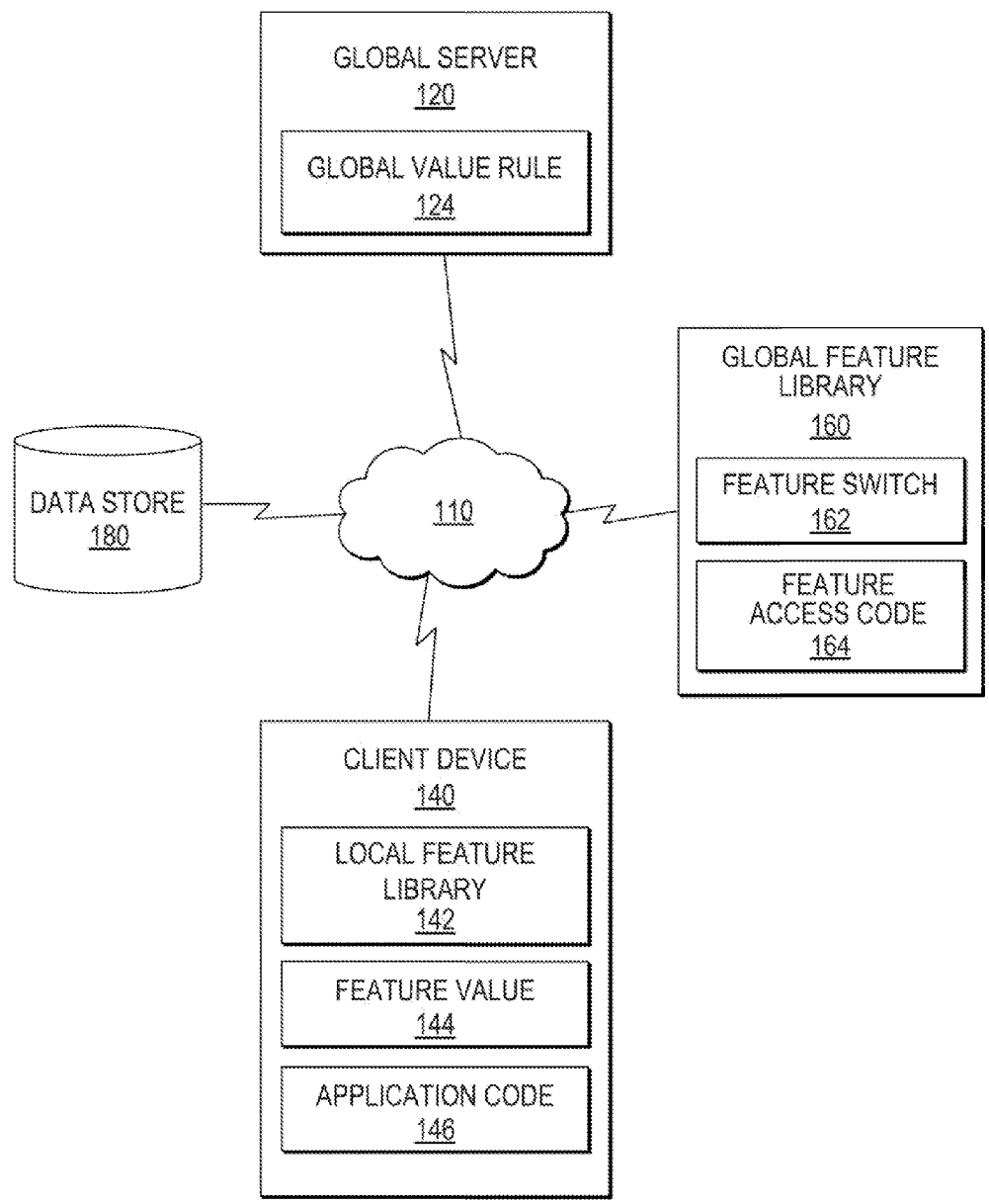
FIG. 1 illustrates a network environment to manage a global feature library in a continuous delivery software lifecycle according to an example.

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure.

Continuous integration (CI) and continuous deploymen (CD) automate the construction, testing, and deployment of code assemblies with a code change. Continuous integration automates the process of retrieving code changes from a source configuration management (SCM) tool, constructing deliverable assemblies, such as executing a build and unit testing the assemblies. The automation begins after a code change is committed to the SCM tool. When the code change is committed to the SCM tool, the code change is assigned to a particular continuous deployment pipeline (CD pipeline or deployment pipeline). The code change moves through the continuous deployment pipeline as the code change is tested as part of a code base or an assembly of code.

Continuous deployment extends continuous integration by automatically deploying the assemblies into a test environment and executing testing on the assemblies. A core practice of continuous deployment is to develop all the code on one repository, such as a SCM tool, without branching the code repository. While this practice reduces code mergers and ensures the code is "in production" from the time of deployment, at times the code is "in production" prematurely. For example, the code may pass the tests in the test environment but does not have full functionality or stability in production. Feature switches have been developed and used to turn a feature on and/or off in production. Feature switches place source code that performs a feature within an "if then" clause and uses the "if statement" to determine when the feature should be active. A feature value is used to determine when the feature is active is typically a local value that must be defined within the application code on each local device, For example, if a company runs a website on one thousand local or distributed client devices across the country and wants to remove a feature, the feature value must be updated on each of the devices since there is not a global on or off switch for the feature that can be distributed to all of the client devices.

In examples, a method to manage a global feature library is provided. The method provides a global feature library with a plurality of features defined in the library. The global feature library includes a feature switch for each of the plurality of features. The feature switch is useable with an application code. The feature switch is linked to an application code. The feature switch includes a feature value that turns a feature associated with the feature switch on and off based on a global value rule. The global rule is transmitted to a client device capable of storing the feature value in-memory. By storing the feature value in-memory on the client device, the feature provides a global and scalable solution yet be efficiently accessed at runtime.

The phrase "application code" refers to source code for a software application.

The phrase "continuous deployment pipeline" or "deployment pipeline" refers to a set of actions executed serially and/or in parallel on a queue to approve source code (or code) for the software application. For example, the continuous deployment pipeline may include building the code, executing unit tests, deploying the code, running automated tests, staging the code, running end-to-end tests, and deploying the code to production.

The phrase "feature library" refers to a feature switch or feature name that identifies the "function" of the feature or flag. The feature library provides the ability to define feature values to each feature switch. A global feature library provides global access to a feature library for client devices and applications. A client device may store a copy of the feature library locally on the client device or a data store connected thereto. The local copy of the feature library is synchronized with the global feature library and contains local information for quick access The term "feature or flag" refers to code that performs a specific function. The term feature is used hereinafter to refer to a feature or a flag. The feature is stored within the application code (or a local library associated with the application code) and is in the same programming language as the application code.

The phrase "feature switch" refers to the term used in the global feature library to identify the feature.

The phrase "feature value" refers to the actual value assigned to the feature switch that turns the feature on or off in each application code. The actual value is stored locally. i.e., on the client device.

The phrase "feature access code" refers to a generic computer code that is used to access the global feature library and return access to the value of the feature. The feature access code may access the global version of the global feature library or a local or in-memory version of the global feature library. The features in the feature library may be accessed in multiple programming languages depending on the programming language of the application code. For example, the feature access code may be a generic code that accesses the feature in multiple programming languages such as, Ruby, PHP, SQL, Javascript, Java, C++, and C#.

FIG. 1 illustrates a network environment 100 to manage a global feature library in a continuous delivery software lifecycle according to an example. The network environment 100 includes a link 110 that connects a global server 120, a client device 140, a global feature library 160, and a data store 180. The global server 120 represents generally any computing device or combination of computing devices that manages a global feature library 160. The global server 120 provides a centralized location to update client devices 140 and manage features from a global feature library 160.

The global feature library 160 is a central repository for features for an application code 146. The global feature library 160 represents generally any database that stores a feature switch 162. Each feature switch 162 defines a feature in the application code, such as code, application configuration, or database that is turned on and off based on conditions. The global feature library 160 also includes a feature access code 164 to access that feature in the application code. The global features defined by the features switch 162 may be incorporated into an application code 146 deployed in a continuous delivery environment using, for example, a continuous deployment pipeline.

For example, a developer may access, add, and/or remove feature switches 162 to the global feature library 160 using, for example, a macro. The macro that can quickly embed a feature switch 162 into an application code 146 from a list of features existing and/or in development, such as an application lifecycle management tool. The feature may be selected after the macro is activated and an "if then" clause is generated in the application code 146. The macro adds the feature switch 162 to the global feature library 160 and available to others via interfaces, such as through the global server 120. Similarly when the feature switch 162 is removed from an application code 146, the developer may use a macro to automatically remove the feature switch 162 from the global feature library and provide a notification that the feature switch 162 is no longer available.

The developer sets defaults and initializes the features and the feature switches 162 using, for example an interface on the global server 120 that is integrated into a developer's integrated development environment. The developer may use the interface to view definitions of the feature and the feature switches 162. The developer may also use the interface to initialize the conditions and defaults of the feature switch 162. To make the initialization process more efficient, the developer can use a configuration file, a database, an application programming interface call such as, REpresentational State Transfer (REST), or custom applications to make modifications in real-time.

The developer can also restrict access to the features. For example, specific access right or user credentials may be needed to add, remove, update or change a feature switch 162. The access rights may be determined by user and/or machines based on pre-defined criteria.

The client device 140 represents a computing device and/or a combination of computing devices configured to interact with the global server 120 and via the link 110. The interaction may include transmitting and/or receiving data related to an application code 146 and/or a feature switch 162. The client device 140 may be, for example, a local server or a personal computer which includes a software application managed by the global server 120. The client device 140 stores the application code 146 for the software application and run the software application for the user. The client device 140 also includes local data relating to the global feature library 160.

For example, the client device 140 receives local feature library 142 from the global server 120. The local feature library 142 includes data from the global feature library 160, such as a copy of the feature switches 162, the feature access code 164, and/or the global value rule 124 distributed through the global server 120. The client device 140 stores a portion of the local feature library 142 in-memory including the feature value 144 that is used to turn the feature switch 162 on or off based on a global value rule 124. The global rule value 124 is received with the local feature library 142 from the global server 120.

Use of the local feature library 142 to locally or in-memory store features values 144, for example, optimizes the performance of the client device 140 at runtime because the client device 140 does not need to query the global server 120 during execution of the application code. Instead a distributed and scalable system of client devices 140 with local or in-memory storage are provided to efficiently obtain feature data and avoid loss of efficiency due to a centralized server that is slow. On start-up or initialization, the client device 140 take advantage of the local feature library 142 and efficiently query the global server 120 and update the local feature library 142 to be synchronized with the global feature library 160, while the application programs are loading to ensure quick access at runtime.

Moreover, the use of a global feature library 160 that centrally stores the data and distributes it to the local feature library 142 provides a scalable solution that enables usage of the feature switches 162 across servers, domains, networks, and/or data centers including usage in cloud computing. For example, the local feature library 142 may be used to efficiently distribute updates or access to the features to all the client devices 140 and/or a subset of the client devices 140. When only a subset of the client devices 140 receive an update or access to a feature, the global server 120 may strategically limit or control the number of users of a feature based on, for example, domains, machine addresses, and/or characteristics of the machine to test the feature under specific conditions in production.

The data store 180 represents generally any memory, such as data repository, configured to store data that can be accessed by the global server 120, the client device 140, and/or the global feature library 160 in the performance of its function. The global server 120 functionalities may be accomplished, via the link 110 that connects the global server 120 to the client device 140, the global feature library 160, and the data store 180.

The link 110 represents generally one or more of a cable, wireless, fiber optic, or remote connections via a telecommunication link, an infrared link, a radio frequency link, or any other connectors or systems that provide electronic communication, The link 110 may include, at least in part, an intranet, the Internet, or a combination of both. The link 110 may also include intermediate proxies, routers, switches, load balancers, and the like.

Figure 2:
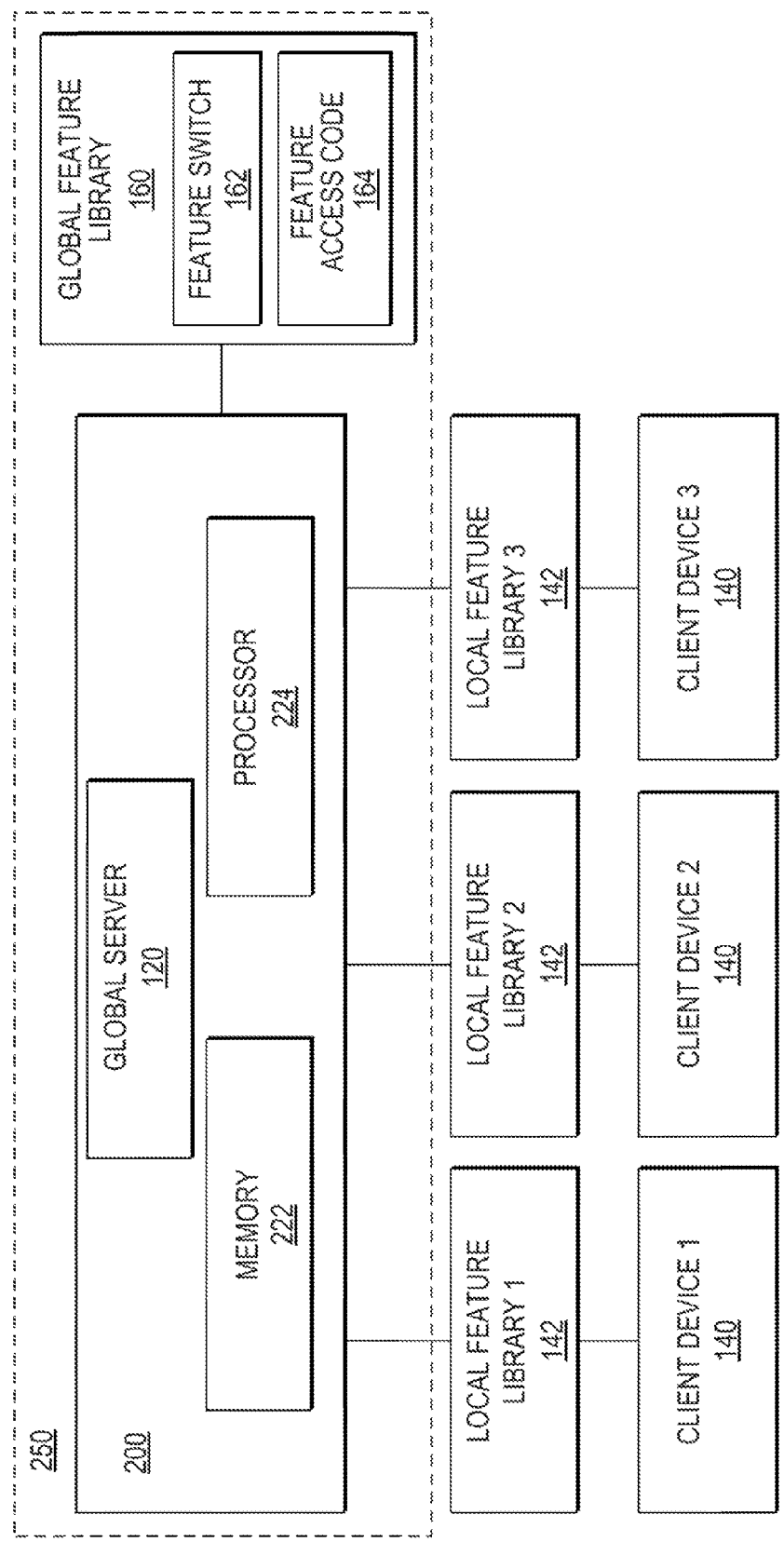
FIG. 2 illustrates a block diagram of an apparatus and system to manage the global feature library according to an example.

FIG. 2 illustrates a block diagram of an apparatus 200 to manage a global feature library 160 according to examples. The apparatus 200 is useable with a continuous deployment pipeline and includes the global server 120, a memory 222, and a processor 224. The global server 120 manages a global feature library 160. The memory 222 stores a set of instructions. The processor 224 is coupled to the memory 222 to execute the set of instructions.

The set of instructions provide the global feature library 160 with a plurality of features defined in the library. The global feature library 160 includes a feature switch 162 for each of the plurality of features. The feature switch 162 is useable with an application code 146 on a client device 140.

The set of instructions link the feature switch 162 to an application code 146. The feature switch 162 includes a feature value 144 associated therewith. The feature value 144 turns a feature associated with the feature switch 162 on and off based on a global value rule 124.

The set of instructions transmit the global value rule 124 to a client device 140 capable of storing the feature value 144 in-memory thereon. The client device 140 creates a distributed system of local devices that enable quick access to the feature values 144 without having to access the global server 120 each time a value is needed.

The apparatus 200, when combined with the global feature library 160, provides a system 250 for management of the global feature library 160. The system 250 is usable with a client device 140 that for example, has application code 146 deployed through a deployment pipeline. The system 250 distributes data from the global feature library 160 to the client devices 140 via a local feature library 142 that contains copies of a portion of the global feature library 160. The local feature library 142 corresponds to the client device 140 and is stored locally or in-memory on the client device 140.

As illustrated in FIG. 2, the global server 120 receives the global feature library 160 data from the global feature library 160. The global server 120 then transmits a local feature library 142 to a plurality of client devices 140 FIG. 2 illustrate the global server 120 connected to three client devices 140, e.g., client devices 1-3, and three local feature libraries 142, e.g., local feature library 1-3. The local feature library 142 includes a portion of the global feature library 160 stored locally or in-memory, such that the local feature library 142 is actually on the client device 140 and/or accessible via a local database connected thereto. Data stored in the local feature library 142 may include the, the feature value 144, feature switch 162, and/or the feature access code 164.

Figure 3:
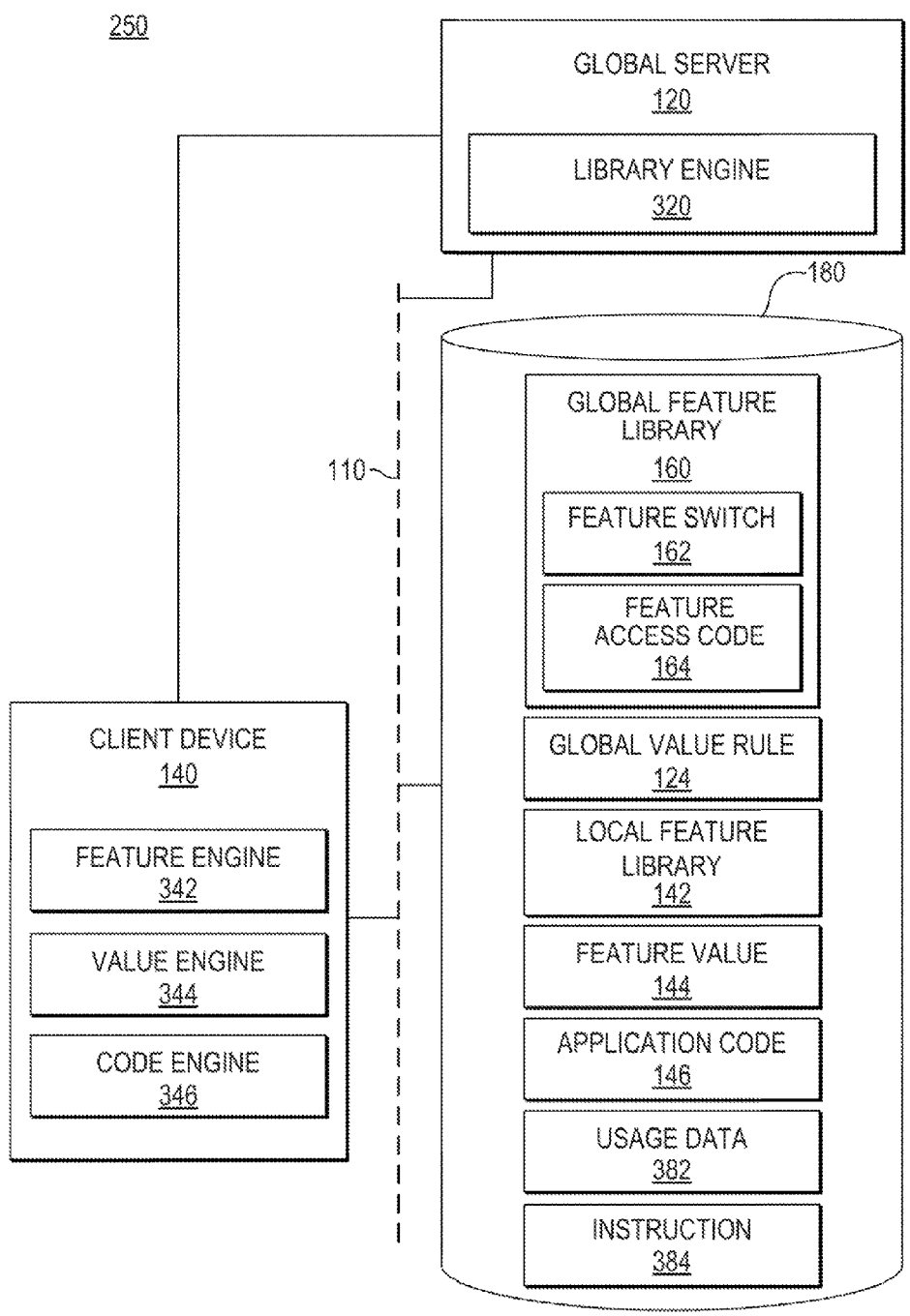
FIG. 3 illustrates block diagram of a system useable with the network environment of FIG. 1 to manage the global feature library according to an example.

FIG. 3 illustrates a block diagram of a system 250 useable with the environment 100 of FIG. 1 according to an example. The system 250 manages a global feature library. The system 250 includes the global server 120, the global feature library 160, and the data store 180. As illustrated in FIG. 1, the global server 120, the global feature library 160, and the data store 180 are connected via the link 110.

The global feature library 160 has a plurality of features defined therein. The global feature library 160 includes a feature switch 162 for each of the plurality of features. The feature switch 162 is useable with an application code 146. The feature switch 162 is linkable to an application code 146. The global feature library calls the feature access code 164 associated with the feature switch 162, and the feature access code 164 calls the feature in the programming language of the application code 146.

The global feature library 160 supports multiple programming languages and, provides similar user experiences relating to the feature switches 162 and code macros across the programming languages. For example, developers are able to use the global feature library 160 in a preferred development setting and streamline the use of the feature switches 162 across server several technologies in a tiered and/or composite application. Examples of programming languages include Ruby, PHP, SQL, Javascript, Java, C++, and C#.

The feature switch 162 includes a feature value 144 associated therewith. The feature value 144 turns a feature associated with the feature switch 162 on and off based on a global value rule 124. The global value rule 124 is transmittable to a client device 140 capable of storing the feature value 144 in-memory thereon.

The global server 120 is connected to the global feature library 160 and manages the global feature library 160. The global server 120 is connected to the client device 140 and provides the client device 140 with the feature value to store in-memory. The client device 140 stores the feature value in-memory to enable quick access via a distributed system instead of requiring the client device 140 to query the global server 120 each time a feature value is needed. However, when the feature value changes, the global server 120 transmits an update to the local feature library 142, which updates the feature value 144 in-memory on the client device 140. The update transmission is triggered when, for example, a request is made to change the global value rule 124. The update may occur due to scheduled or periodical polling of the global server 120 for updates. The local code library may also be robust and identify the most recent data from the global server 120 and give that data priority.

The global server 120 is illustrated as including a library engine 320. The library engine 320 represents generally a combination of hardware and/or programming that provides the global feature library to the client device(s) 140 and manages the global feature library for the client device(s) 140. For example, the library engine will manage the feature definitions, initialization, dynamic settings, efficiency issues, synchronization of the client devices 140, formulating conditions and execution, and collection of usage data 382. The library engine 320 also links feature switches of the global feature library 160 to an application code 146 and transmits the global value rule 124 to the client device(s) 140.

The client device 140 is illustrated as including a feature engine 342, a value engine 344, and a code engine 346. The feature engine 342 represents generally a combination of hardware and/or programming that manages the features from the global server 120 for the application code 146 on the client device 140. The data used by the feature engine 342 is provided by the global server 120 and used to update the local feature library 142. The feature engine 342 may also collect usage data 382 corresponding to the features and feature switches 162 utilized. The usage data 382 may be provided to or obtained by the global server 120, evaluated, and/or saved in a data store 180, such as a global repository or the global feature library 160.

The value engine 344 represents generally a combination of hardware and/or programming that stores and updates the feature value 144 in-memory for the client device 140. The feature value 144 may be determined based on the global value rule 124. The code engine 346 represents generally a combination of hardware and/or programming that manages the application code 146. The code engine 346 may use the feature access code 164 to access the code from the application code 146 library associated with the feature.

The data store 180 may store data accessible by the global server 120 and/or the client device 140. The data store 180 is, for example, a database or a combination of databases that stores at least one of the following a global feature library 160 including the global value rule 124, the local feature library, the feature value 144, the application code 146, the feature switch 162, the feature access code 164, the usage data 382, and an instruction 384, such as an instruction to be performed by a processor 224. For example, the data store 180 may include a global data repository to collect and store the usage data 382 for the feature switch 162, the initialization data, and/or configuration file.

Figure 4:
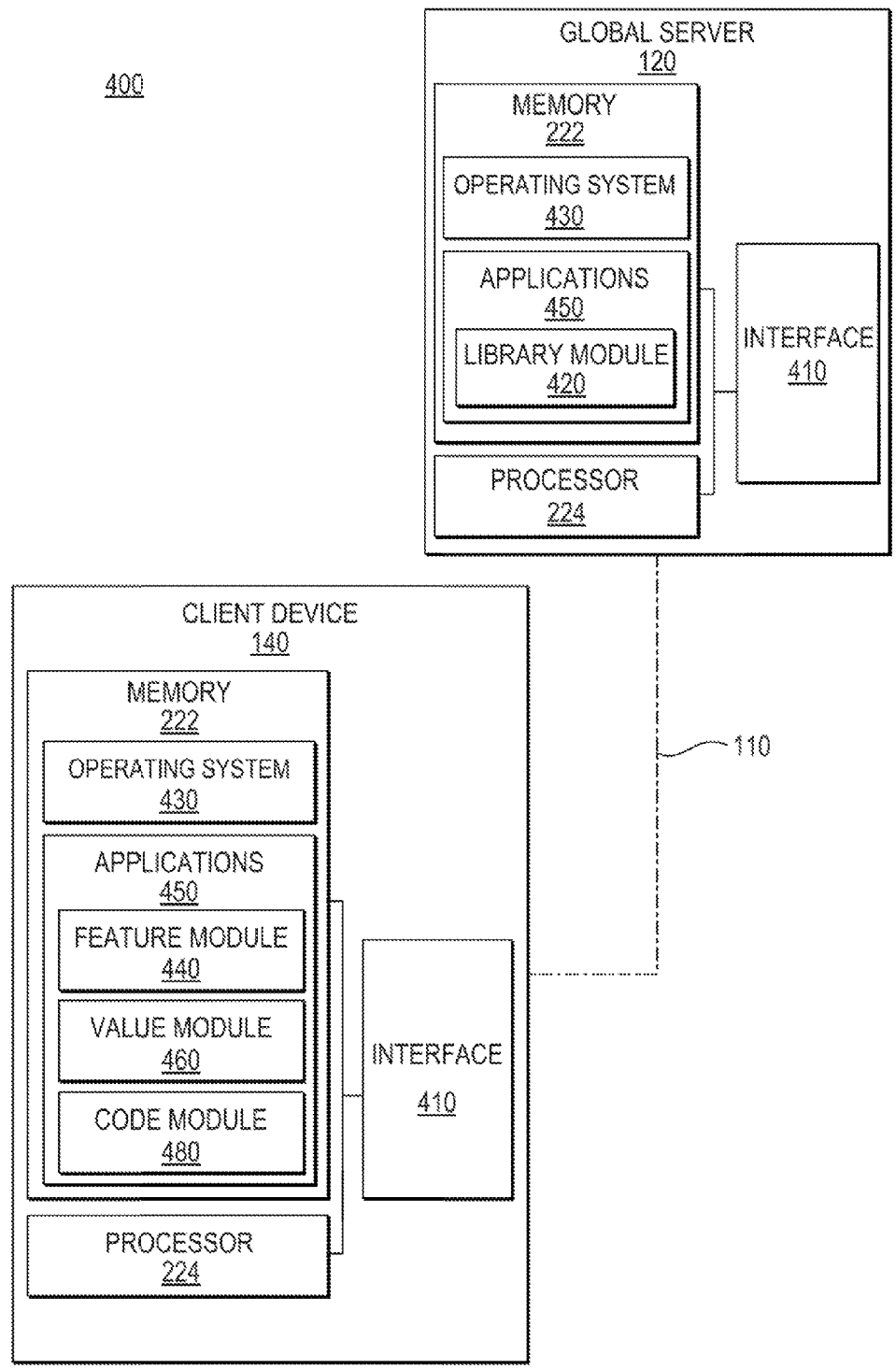
FIG. 4 illustrates a block diagram of a computer readable medium useable with the apparatus of FIG. 2 according to an example.

FIG. 4 illustrates a block diagram of a computer readable medium 400 useable with the apparatus 200 of FIG. 2 according to an example In FIG. 4, the global server 120 is illustrated to include a memory 222, a processor 224, and an interface 410. The processor 224 represents generally any processor configured to execute program instructions stored in memory 222 to perform various specified functions. The interface 410 represents generally any interface enabling the global server 120 to communicate with the client device 140 and/or the, global feature library 160 via the link 110, as illustrated in FIGS. 1 and 3.

The memory 222 is illustrated to include an operating system 430 and applications 450. The operating system 430 represents a collection of programs that when executed by the processor 224 serve as a platform on which applications 450 may run. Examples of operating systems 430 include various versions of Microsoft's Windows® and Linux®. Applications 450 represent program instructions that when executed by the processor 224 function as an application that manages a global feature library usable with continuous delivery. For example, FIG. 4 illustrates a library module 420 as executable program instructions stored in memory 222 of the global server 120.

Referring back to FIG. 3, the library engine 320 of global server 120 and the feature engine 342, the value engine 344, and the code engine 346 of the client device 140 are described as combinations of hardware and/or programming. As illustrated in FIG. 4, the hardware portions may include the processor 224. The programming portions may include the operating system 430, applications 450, and/or combinations thereof. For example, the library module 420 represents program instructions that when executed by a processor 224 cause the implementation of the of the library engine 320 of FIG. 3. The feature module 440 represents program instructions that when executed by a processor 224 cause the implementation of the of the feature engine 342 of FIG. 3. The value module 460 represents program instructions that when executed by a processor 224 cause the implementation of the of the value engine 344 of FIG. 3. The code module 480 represents program instructions that when executed by a processor 224 cause the implementation of the of the code engine 346 of FIG. 3. Additional functionality may be performed by the library module 420, the feature module 440, the value module 460, and/or the code module 480 or by additional module(s).

The programming of the library module 420, the feature module 440, the value module 460, and/or the code module 480 may be processor executable instructions stored on a memory 222 that includes a tangible memory media and the hardware may include a processor 224 to execute the instructions. The memory 222 may store program instructions that when executed by the processor 224 cause the processor 224 to perform the program instructions. The memory 222 may be integrated in the same device as the processor 224 or it may be separate but accessible to that device and processor 224.

In some examples, the program instructions may be part of an installation package that can be executed by the processor 224 to perform a method using the system 250. The memory 222 may be a portable medium such as a CD, DVD, or flash drive or a memory maintained by a server from which the installation package can be downloaded and installed. In some examples, the program instructions may be part of an application or applications already installed on the server. In further examples, the memory 222 may include integrated memory, such as a hard drive.

FIG. 5 illustrates a flow diagram 500 of a method, such as a processor implemented method, to manage a global feature library usable with continuous delivery environment. In block 520, a global feature library is provided with a plurality of features defined therein. The global feature library including a feature switch for each of the plurality of features. The feature switch is useable with an application code. The global feature library stores the feature switch in a plurality of programming languages such that the feature switch causes the global feature library to call the feature access code associated with the feature switch, and the feature access code calls the feature in the programming language of the application code. Examples of programming languages include Ruby, PHP, SQL, Javascript, Java, C++, and C#.

The feature switch is linked to an application code in block 540. The feature switch may be linked and/or unlinked from the application code using at least one of a macro and a user interface. The feature switch includes a feature value associated with it. The feature value may be initialized by the global server and/or the global feature library. In block 560, the feature value turns a feature associated with the feature switch on and off based on a global value rule. The global value rule is transmitted to a client device capable of storing the feature value in-memory or locally.

By storing the feature value in-memory of the client device, the client device avoids delays due to communications with the global server. The feature value on the client device is updated by the global server, which transmits updates relating to the feature value to the client device. One way an update is triggered is when the global server makes a request to change the global value rule. At that time the global server transmits an update to the feature value on the client device. The feature value may be modified in real-time using for example, a configuration file, an application programming interface call such as REpresentational State Transfer (REST), or custom applications.

Access to each of the plurality of feature switches may also be based on a user credential that determines the feature value. For example, the user credentials may be used to change the feature value, and/or limit access to the feature switch to, for example, a specific machine or group of machines for testing and/or management or based on condition such as location of the user, as defined in a repository or the global feature library.

The method may also collect usage data for the feature switch. The usage data includes at least one of where the feature switch is embedded in the application code, when the feature switch is embedded into the application code, who embedding the feature switch, when the feature is on, when the feature switch is off, conditions of when the feature switch is accessed, and the performance effect of the feature switch on the application code's runtime. The usage data may be collected asynchronously and stored in a data store, such as a global data repository accessible by the global server and/or the client device(s).

FIGS. 1-5 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 5 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A processor implemented method to manage a global feature library usable with a continuous delivery environment, the method comprising:

providing the global feature library with a plurality of features defined therein, the global feature library including feature switches for respective features of the plurality of features, each feature switch useable with an application code, the global feature library further including a global value rule;

linking the feature switches to the application code, each feature switch of the feature switches including a feature value associated therewith, the feature value of a first feature switch of the feature switches to turn on and off a first feature associated with the first feature switch based on the global value rule;

in response to a request to change the global value rule, transmitting, by a server, an update of the feature value of the first feature switch to a plurality of client devices that store the feature value of the first feature switch in respective memories of the plurality of client devices, the update to cause a change of the feature value of the first feature switch stored in the respective memories of the plurality of client devices; and transmitting the global value rule to the plurality of client devices that store respective local feature libraries, each local feature library including the global value rule and a subset of the plurality of features.

2. The method of claim 1, further comprising:

storing the first feature switch in the global feature library in a plurality of different programming languages; and calling, by the global feature library, a feature access code associated with the first feature switch, the feature access code calling the first feature in a programming language, selected from among the plurality of different programming languages, of the application code.

3. The method of claim 1, further comprising collecting a usage data for the first feature switch, the usage data including at least one of information of where the first feature switch is embedded in the application code, information of when the first feature switch is embedded into the application code, information of who embedded the first feature switch, information of when the first feature switch is turned on, information of when the first feature switch is turned off, information of conditions of when the first feature switch is accessed, or information of the performance effect of the first feature switch on the application code's runtime.

4. The method of claim 3, further comprising:

collecting the usage data asynchronously; and storing the usage data in a global data store.

5. The method of claim 1, further comprising linking and unlinking the first feature switch from the application code using at least one of a macro or a user interface.

6. The method of claim 1, further comprising limiting access to each of the plurality of features based on a user credential.

7. The method of claim 1, further comprising modifying the feature value of the first feature switch in real-time.

8. The method of claim 1, wherein transmitting the update comprises transmitting a configuration file to the plurality of client devices that use the configuration file to change the feature value of the first feature switch stored in the respective memories of the plurality of client devices.

9. The method of claim 1, wherein transmitting the update comprises transmitting an application programming call to the plurality of client devices that use the application programming call to change the feature value of the first feature switch stored in the respective memories of the plurality of client devices.

10. The method of claim 1, wherein the plurality of features comprise code portions in the application code.

11. The method of claim 1, wherein the global value rule is distinct from the first feature switch and the value of the first feature switch.

12. The method of claim 1, wherein the feature value of a second feature switch of the feature switches is to turn on and off a second feature associated with the second feature switch based on the global value rule, the method further comprising:
responsive to the request to change the global value rule, transmitting, by the server, an update of the feature value of the second feature switch to the plurality of client devices that store the feature value of the second feature switch in respective memories of the plurality of client devices.

13. A system comprising:
a global feature library with a plurality of features defined therein, the global feature library including:
a global value rule,
feature switches for respective features of the plurality of features, each feature switch of the feature switches linkable to an application code,
wherein each feature switch of the feature switches includes a feature value associated therewith, the feature value of a first feature switch of the feature switches to turn on and off a first feature associated with the first feature switch based on the global value rule;
a processor; and
a non-transitory storage medium storing instructions executable on the processor to:
in response to a request to change the global value rule, transmit an update of the feature value of the first feature switch to a plurality of client devices that store the feature value of the first feature switch in respective memories of the plurality of client devices, the update to cause a change of the feature value of the first feature switch stored in the respective memories of the plurality of client devices, to turn on or off the first feature at the plurality of client devices;
store the first feature switch in the global feature library in a plurality of different programming languages; and
call, by the global feature library, a feature access code associated with the first feature switch, the feature access code calling the first feature in a programming language, selected from among the plurality of different programming languages, of the application code.

14. The system of claim 13, further comprising a global data store to collect and store usage data for the first feature switch.

15. The system of claim 13, wherein the instructions are executable on the processor to provide a portion of the global feature library to a local feature library in-memory on a client device.

16. The system of claim 13, wherein the update comprises a configuration file or an application programming call, the plurality of client devices to use the configuration file or an application programming call to change the feature value of the first feature switch stored in the respective memories of the plurality of client devices.

17. A non-transitory machine-readable storage medium storing instructions that upon execution cause a server to:
provide a global feature library with a plurality of features defined therein, the global feature library including feature switches for respective features of the plurality of features, each feature switch useable with an application code, the global feature library further including a global value rule;
link the feature switches to the application code, each feature switch of the feature switches including a feature value associated therewith, the feature value of a first feature switch of the feature switches to turn on and off a first feature associated with the first feature switch based on the global value rule;
in response to a request to change the global value rule, transmit an update of the feature value of the first feature switch to a plurality of client devices that store the feature value of the first feature switch in respective memories of the plurality of client devices, the update to cause a change of the feature value of the first feature switch stored in the respective memories of the plurality of client devices, to turn on or off the first feature at the plurality of client devices; and
transmit the global value rule to the plurality of client devices that store respective local feature libraries, each local feature library including the global value rule and a subset of the plurality of features.

18. The non-transitory machine-readable storage medium of claim 17, wherein the global value rule is distinct from the first feature switch and the value of the first feature switch.

* * * * *